United States Patent [19]

Aulerich et al.

[11] Patent Number: 5,251,926
[45] Date of Patent: Oct. 12, 1993

[54] RATCHET ASSEMBLY FOR AN ADJUSTABLE STABILIZER BAR

[75] Inventors: Jeffrey R. Aulerich, Eagle; Michael A. Ferguson, Okemos, both of Mich.

[73] Assignee: General Motors Corporation, Detroit, Mich.

[21] Appl. No.: 909,333

[22] Filed: Jul. 6, 1992

[51] Int. Cl.⁵ .............................................. B60G 11/20
[52] U.S. Cl. ................................... 280/665; 267/188; 267/277; 280/689; 280/723
[58] Field of Search ................ 280/689, 723, 665; 267/273, 277, 183, 184, 185, 188

[56] References Cited

U.S. PATENT DOCUMENTS

| | | | |
|---|---|---|---|
| 3,085,817 | 4/1963 | Krause et al. | 280/723 |
| 3,197,233 | 7/1965 | Van Winsen et al. | 280/112 |
| 3,337,236 | 7/1967 | Peterson | 280/124 |
| 3,504,930 | 4/1970 | Kozowyk et al. | 280/124 |
| 3,913,939 | 10/1975 | Sinclair et al. | 280/124 |
| 4,094,532 | 6/1978 | Johnson et al. | 280/695 |
| 4,648,620 | 3/1987 | Nuss | 280/689 |
| 4,919,444 | 4/1990 | Leiber et al. | 280/707 |
| 5,186,486 | 2/1993 | Hynds et al. | 280/689 |

Primary Examiner—Eric D. Culbreth
Attorney, Agent, or Firm—A. Michael Tucker

[57] ABSTRACT

An adjustable stabilizer bar assembly includes a housing rotatably mounting a stabilizer bar in a first bore. A second bore in the housing slidably receives an actuation pin. A plurality of dowels are slidably provided between the first and second bores. As the actuation pin is slid into the housing, selected dowels are forced into respective grooves on the stabilizer bar, thereby ratcheting the stabilizer bar toward a limited rotational range. Sensors and a driver may input data to a controller to selectively position the actuation pin, thereby providing a desired degree of roll resistance.

12 Claims, 3 Drawing Sheets

RATCHET ASSEMBLY FOR AN ADJUSTABLE STABILIZER BAR

BACKGROUND OF THE INVENTION

1. Field Of The Invention

The present invention relates generally to automotive wheel suspensions, and in particular is concerned with an adjustable suspension stabilizer bar.

2. Description Of The Related Art

The use of stabilizer bars in automotive suspensions systems is well-known. Stabilizer bars commonly include a transverse torsional segment pivotally attached to a vehicular chassis and leading or trailing longitudinal segments attached to a control arm or wheel carrier. Generally, the torsional segment is mounted perpendicular to the longitudinal axis of a vehicle between opposite wheel assemblies. During a cornering maneuver, torsional resistance from the stabilizer bar decreases roll or lean of the vehicular body.

Various configurations for adjustable stabilizer bars are known in the art, many of which are costly. Some configurations use a clutch to couple a split stabilizer bar, and electronic and/or hydraulic controllers may be used to perform the coupling. Also, it is known to use a large diameter stabilizer bar to increase roll rigidity. However, a large diameter stabilizer bar is heavy and costly, and can adversely affect vehicular suspension.

It is desirable to provide a variable stabilizer bar which is economical, lightweight and durable. Preferably, adjustment of such a stabilizer bar can be manually performed by a driver or automatically by a controller receiving various inputs concerning driving conditions.

SUMMARY OF THE INVENTION

The present invention includes an economical and lightweight adjustable stabilizer bar. A ratchet assembly guides and limits the amount of rotation a stabilizer bar may encounter, thereby providing adjustable roll resistance. The ratchet assembly may be actuated manually by a driver or automatically by a controller.

In a preferred embodiment, an adjustable stabilizer bar assembly includes a housing rotatably mounting a stabilizer bar in a first bore. A second bore in the housing slidably receives an actuation pin. A plurality of dowels are slidably provided between the first and second bores. As the actuation pin is slid into the housing, selected dowels are forced into respective grooves on the stabilizer bar, thereby ratcheting the stabilizer bar toward a limited rotational range. Sensors and a driver may input data to a controller to selectively position the actuation pin, thereby providing a desired degree of roll resistance.

DETAILED DESCRIPTION OF THE PREFERRED EMBODIMENTS

Figure 1:
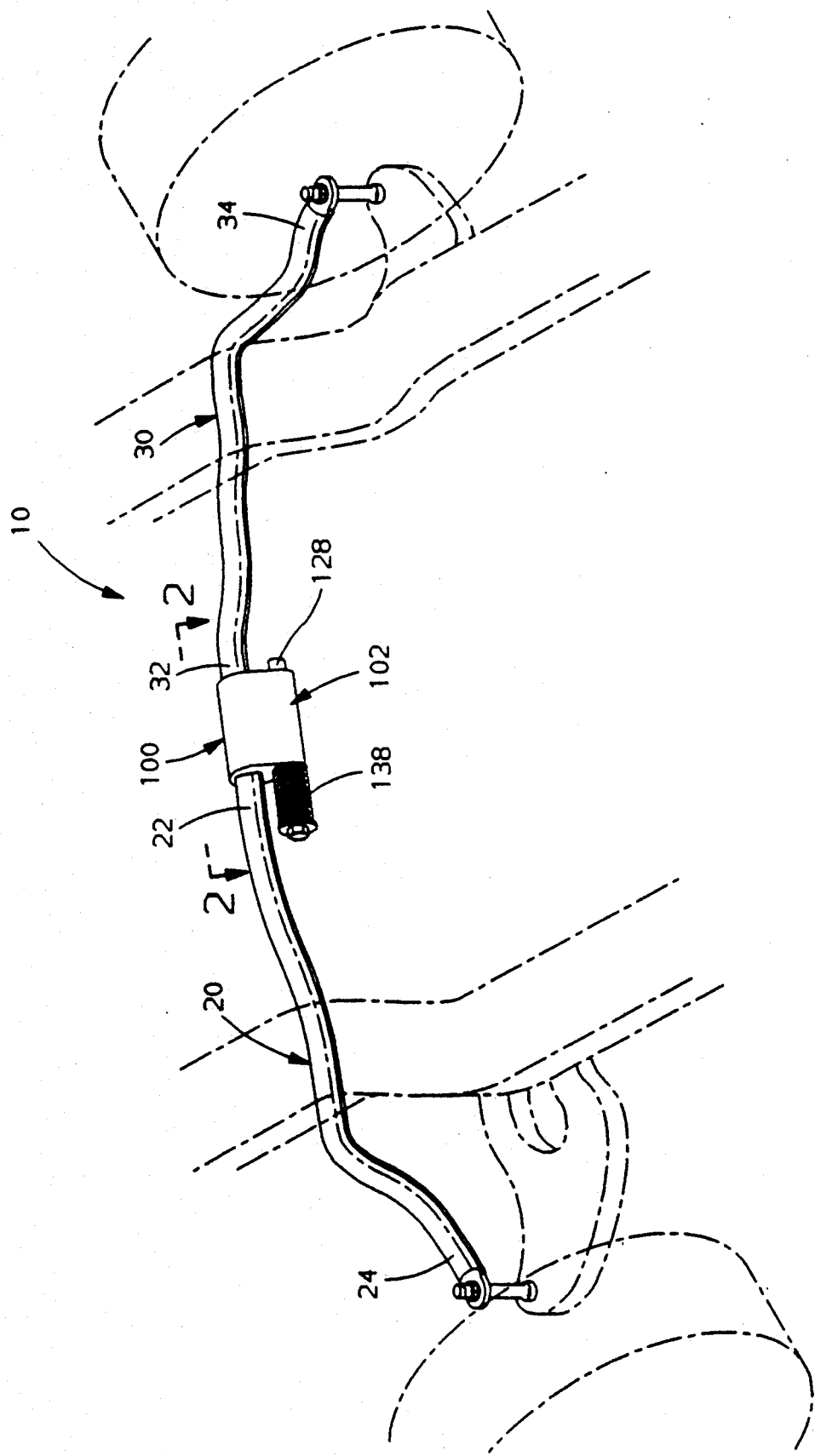
FIG. 1 is a perspective view of an adjustable stabilizer bar assembly incorporating a ratchet device according to the present invention.
Figure 2:
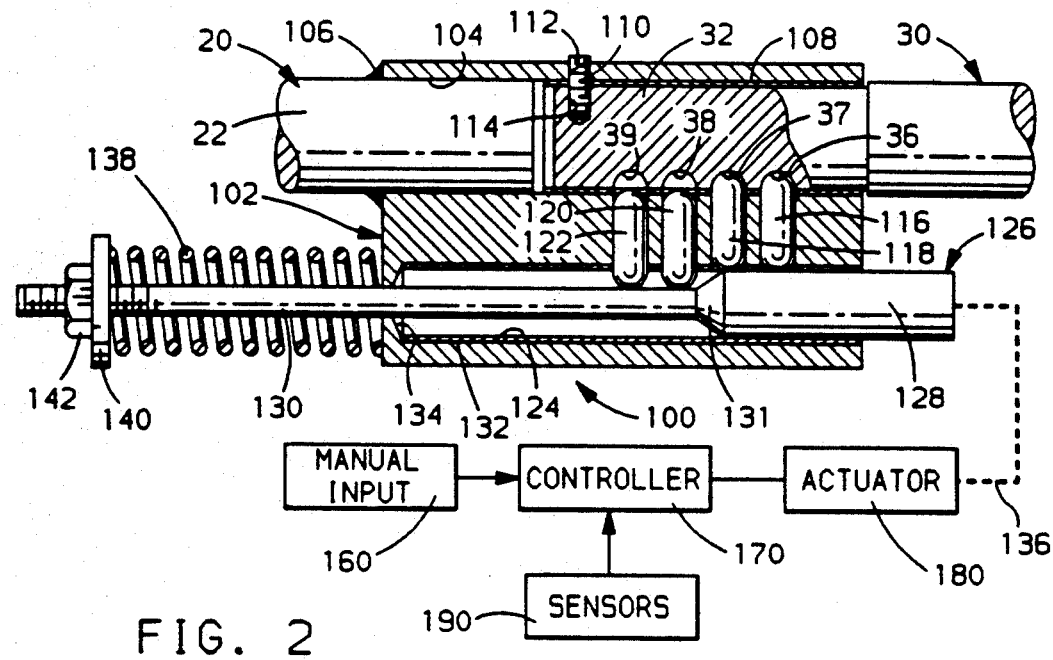
FIG. 2 is a sectional view through the ratchet device taken along line 2—2 of FIG. 1.
Figure 3A:
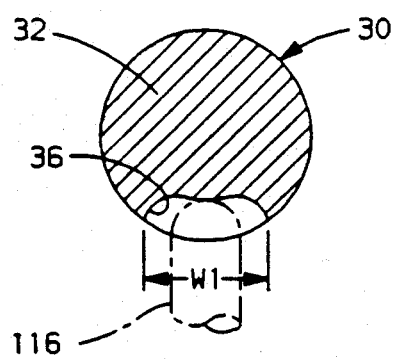
FIGS. 3A–3D are sectional views from FIG. 2 illustrating the progressively smaller widths of grooves formed on an outer surface of a stabilizer bar.
Figure 3B:
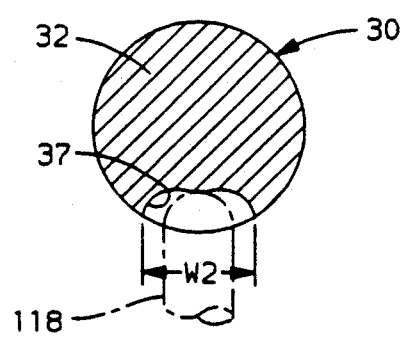
Figure 3C:
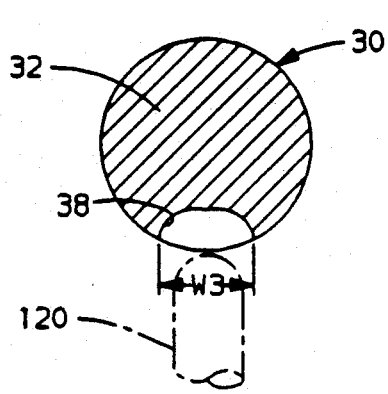
Figure 3D:
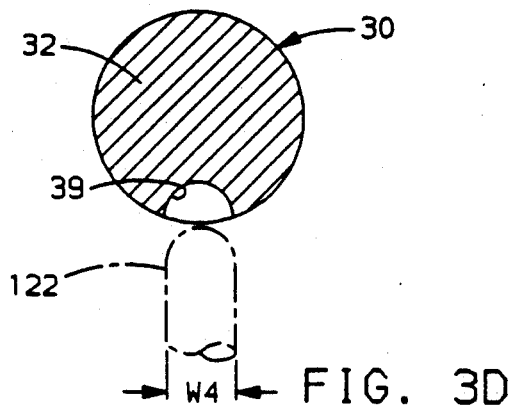

An adjustable stabilizer bar assembly indicated generally at 10 is illustrated in FIG. 1. A first half bar 20 includes an inner end 22 mounted in a ratchet device 100 and an outer end 24. A second half bar 30 includes an inner end 32 mounted in the ratchet device 100 and an outer end 34. The outer ends 24 and 34 are mounted in any desired manner to vehicular suspension components (e.g., opposite control arms) so that the stabilizer bar assembly 10 is transversely mounted about the longitudinal axis of a vehicle in a well-known manner.

The ratchet device 100 includes a housing 102 having a first bore 104 of a diameter complementary to the diameters of the inner ends 22, 32. The inner end 22 of half bar 20 is inserted into the left portion of the bore 104 and then fixedly secured to the housing 102 by any suitable means, e.g., by welding as shown at 106. In this manner, the half bar 20 does not rotate with respect to the housing 102.

A sleeve bearing 108 is preferably provided in the right portion of the bore 104 to receive the inner end 32 of half bar 30. A set screw 110 is threaded through a slot 112 in the housing 102 into an opening 114 in the inner end 32 to fix the longitudinal position of the half bar 30 with respect to the housing 102. As described below, the half bar 30 is normally free to rotate inside the sleeve bearing 108 with respect to the housing 102.

Four dowels 116, 118, 120, 122 are provided in respective slots between the first bore 104 and a second bore 124. An actuation pin 126 having a working diameter portion 128 and a reduced diameter portion 130 is slidably received in a sleeve bearing 132 preferably mounted in the second bore 124. Preferably, a conical diameter 131 provides a transition from the working diameter portion 128 to the reduced diameter portion 130. When the actuation pin 126 is moved from right to left in the second bore 124 as described below, the dowels 116, 118, 120, 122 are urged upwardly through respective slots by the working diameter portion 128 to complementary longitudinal-spaced grooves 36, 37, 38, 39 provided in an outer surface of the inner end 32.

As illustrated best in FIGS. 3A–3D, the area of the grooves 36–39 varies in a progressively smaller range from groove 36 to groove 39. Preferably, the depths of the grooves 36–39 are substantially the same, but the widths of the grooves 36–39 are progressively smaller. For example, the width W2 of groove 37 is smaller than the width W1 of groove 36. The width W3 of groove 38 is smaller yet, while the width W4 of groove 39 is the smallest and preferably approximately equal to the width W of engagement dowel 112.

In operation, the actuation pin 126 is first positioned in the second bore 124 so that the working diameter portion 128 does not contact any dowels 116, 118, 120, 122. In this position, the right half bar 30 is relatively free to rotate within the housing 120. As the half bar 30 rotates, dowels 116, 118, 120, 122 are forced downwardly and project into the second bore 124. When an operator prefers more roll resistance in a vehicle, i.e., a "stiffer" stabilizer bar, a manual input 160 can be delivered to a controller 170 which in turn sends a signal to an actuator 180. The actuator 180 urges the actuation pin 126 to the left into the second bore 124. Depending upon the stiffness desired, the travel range of the actuation pin 126 will be selected. As limited additional stiffness is desired, the working diameter portion 128 of pin 126 will contact dowel 116 so that dowel 116 is forced into complementary groove 36. When the dowel 116 is in groove 36, the arc of rotation of half bar 30 is limited to the width W1 of the groove 36. As additional stiffness is desired, the travel range of the actuation pin 126 will be increased to the left into the second bore 124 by the actuator 180 so that additional dowels 118, 120, 122 are forced into respective grooves 37-39. Under maximum stiffness, the working diameter portion 128 of actuation pin 126 abuts a conical seat 134 found at the left end of the second bore 124 so that all dowels 116, 118, 120, 122 are seated in their respective grooves 36-39. As dowels 116, 118, 120, 122 are successively engaged, the half bar 30 is ratcheted toward a limited rotational position, thereby providing more resistance to body roll. To reduce roll rigidity, the actuator 180 moves the actuation pin 126 to the right so that various dowels 122, 120, 118, 116 are successively free to move within their respective slots.

The actuation pin 126 can be connected by a cable 136 to the actuator 180. The cable 136 can be preloaded by a coil spring 138 which is concentrically mounted about the reduced diameter portion 130 between the housing 102 and a washer 140. The washer 140 is retained by a nut 142 threaded onto the end of the reduced-diameter portion 130.

Various vehicle-condition sensors 190 (e.g., braking, acceleration, etc.) can provide inputs to the controller 170 for automatic position selection of the actuation pin 126, thereby providing a variable stabilizer bar assembly 10.

Figure 4:
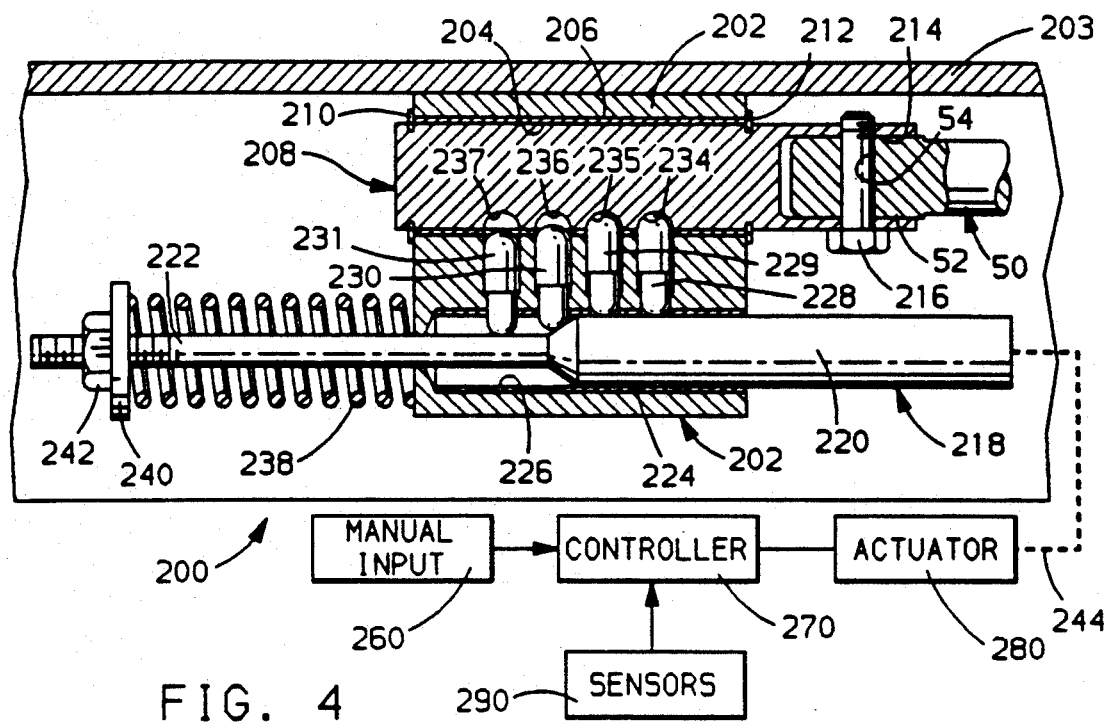
FIG. 4 is a sectional view of a second embodiment of a ratchet device according to the present invention.
Figure 5A:
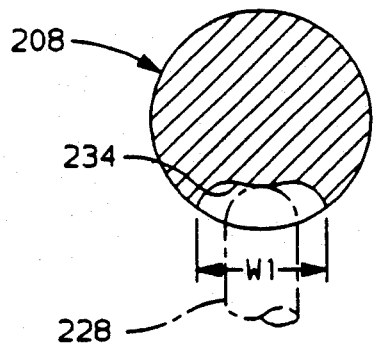
FIGS. 5A–5D are sectional views from FIG. 4 illustrating the progressively smaller widths of grooves formed on an outer surface of a stabilizer bar holder.
Figure 5B:
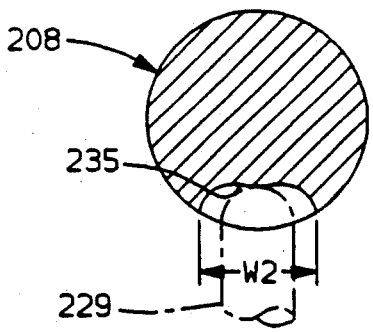
Figure 5C:
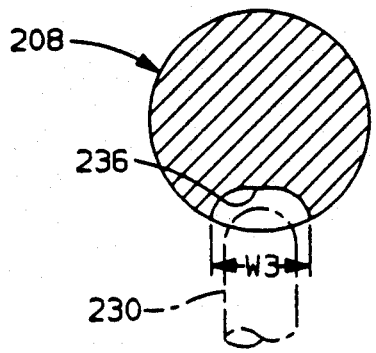
Figure 5D:
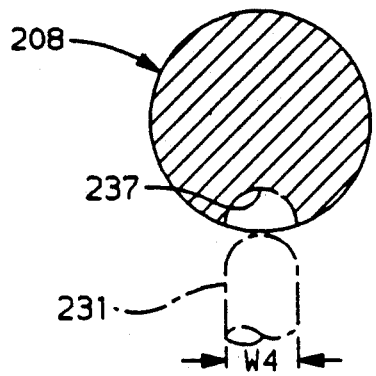

A second embodiment of the present ratchet device is indicated generally at 200 in FIG. 4. A housing 202 is securely mounted on a base 203, e.g., an axle. The housing 202 includes a first bore 204 lined with a sleeve bearing 206. A bar holder 208 is rotatably mounted in the sleeve bearing 206 and longitudinally fixed with respect to the housing 202 by C-clips 210, 212 mounted on the bar holder 208 adjacent each end of the housing 202.

A bore 214 in the right end of the bar holder 208 receives a first end 52 of a stabilizer bar 50. The opposite end of the stabilizer bar 50 is mounted to a suspension component (not illustrated) in any desired manner. A retaining pin 216 is threaded through an opening 54 in the stabilizer bar 50 to the bar holder 208 to rotationally fix the bar holder 208 with the stabilizer bar 50.

An actuation pin 218 having a working diameter portion 220 and a reduced diameter portion 222 is slidably received in a sleeve bearing 224 in a second bore 226 in the housing 202. Four dowels 228, 229, 230, 231 are loosely mounted in complementary slots in the housing 202 and aligned with complementary grooves 234, 235, 236, 237 on an outer surface of the bar holder 208. In a manner similar to that described for the half bar 30 of FIGS. 1, 2, and 3A-3D, the grooves 234-237 of the bar holder 208 have progressively decreasing widths W1-W4 as illustrated in FIGS. 5A-5D.

As the actuation pin 218 is slid to the left by an actuator 280, the working diameter portion 220 of the actuation pin 218 contacts dowels 228-231 and urges them into their respective grooves 234-237. For minimum roll stiffness, the actuation pin 218 is in a position to the right so that none of the dowels 228-231 are contacted by the working diameter portion 220. For maximum roll stiffness by the stabilizer bar 50, the actuation pin 218 is slid to the left-most position in the second bore 226 so that dowels 228-231 are forced into their respective grooves 234-237.

The actuation pin 218 and a cable 244 can be preloaded by a coil spring 238, a washer 240 and a nut 242 as illustrated in FIG. 4. A controller 270 can receive manual inputs 260 and/or sensory inputs 290.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. An adjustable stabilizer bar assembly for an automotive suspension, comprising:
    (a) a housing;
    (b) a first bore in the housing rotatably mounting stabilizer bar means;
    (c) a second bore in the housing slidably receiving actuator means; and
    (d) a plurality of dowels slidably provided between the first and second bores,
    whereby different ones of the dowels are received in complementary grooves on the stabilizer bar means as the actuator means is slid into the second bore.

2. The stabilizer bar assembly specified in claim 1 wherein the widths of the grooves on the stabilizer bar means vary to provide a selectable degree of restraint on the rotation of the stabilizer bar means.

3. The stabilizer bar assembly specified in claim 1 wherein the stabilizer bar means comprises first and second stabilizer bars.

4. The stabilizer bar assembly specified in claim 1 wherein the stabilizer bar means comprises a bar holder connected to a stabilizer bar.

5. The stabilizer bar assembly specified in claim 1 wherein the actuator means includes an actuation pin having a portion selectively engageable with the dowels.

6. The stabilizer bar assembly specified in claim 1 including bearing means in the first and second bores.

7. A ratchet device for selectively varying the rotation of an automotive stabilizer bar, comprising:
    (a) a housing;
    (b) a first bore in the housing rotatably receiving the stabilizer bar, wherein the stabilizer bar includes a plurality of grooves formed on its outer surface;
    (c) a second bore in the housing slidably receiving an actuator means; and
    (d) a plurality of dowels slidably arranged between the first and second bores and aligned with grooves of the stabilizer bar,
    whereby different ones of the dowels are received in respective grooves of the stabilizer bar as the actuator means is slid into the second bore.

8. The ratchet device specified in claim 7 wherein the widths of the grooves on the stabilizer bar vary to provide a selectable degree of restraint on rotation of the stabilizer bar.

9. The ratchet device specified in claim 7 wherein the actuator means includes a pin and an actuator for sliding the pin.

10. The ratchet device specified in claim 9 including a controller for controlling the actuator.

11. The ratchet device specified in claim 10 including sensors inputting vehicle data to the controller.

12. The ratchet device specified in claim 10 including means for driver inputs to the controller.

* * * * *